United States Patent
Toncelli (10) Patent No.: US 10,739,747 B2
(45) Date of Patent: *Aug. 11, 2020

(54) APPARATUS FOR CUTTING SLAB MATERIAL

(71) Applicant: Dario Toncelli, Bassano del Grappa (IT)

(72) Inventor: Dario Toncelli, Bassano del Grappa (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,326

(22) Filed: Jan. 4, 2018

(65) Prior Publication Data

US 2018/0129183 A1 May 10, 2018

Related U.S. Application Data

(63) Continuation of application No. 13/944,393, filed on Jul. 17, 2013, now Pat. No. 9,886,019.

(30) Foreign Application Priority Data

Apr. 10, 2013 (IT) ................. TV2013A0048

(51) Int. Cl.
*G05B 19/18* (2006.01)
*B28D 1/22* (2006.01)
(Continued)

(52) U.S. Cl.
CPC ............. *G05B 19/18* (2013.01); *B23D 47/02* (2013.01); *B28D 1/003* (2013.01); *B28D 1/043* (2013.01); *B28D 1/22* (2013.01); *B28D 7/04* (2013.01)

(58) Field of Classification Search
CPC .......... G05B 19/18; B28D 1/003; B28D 7/04; B28D 1/22; B28D 1/043; B23D 47/02
See application file for complete search history.

(56) References Cited

U.S. PATENT DOCUMENTS 3,634,975 A 1/1972 Hensley
3,776,072 A 12/1973 Oswell et al.
(Continued)

FOREIGN PATENT DOCUMENTS

CH 677897 A5 7/1991
DE 9202023 U1 6/1992
(Continued)

OTHER PUBLICATIONS

"CNC Sawjet Products", Northwood, https://northwoodmachine.com/products/categories/cnc-sawjet/ (Year: 2019).*
(Continued)

*Primary Examiner* — Charles R Kasenge
(74) *Attorney, Agent, or Firm* — Fredrickson & Byron, P.A.

(57) ABSTRACT

An apparatus for cutting slab material comprising a working table to support the slabs to be cut during working; a working unit comprising disk cutting means and water-jet cutting means; and a unit for moving the working unit above the working table. The movement unit comprises a horizontal translation unit to move the working unit along two directions parallel to the working table and perpendicular to each other; a vertical translation unit to move the working unit along a direction perpendicular to the working table; a first rotation unit to rotate the working unit about a first axis, vertical and substantially perpendicular to the working table; and a second rotation unit to rotate the working unit about a second axis, inclined with respect to the first axis. Said disk cutting means and water-jet cutting means are integral and therefore the second rotation unit rotates simultaneously with the said cutting means.

19 Claims, 9 Drawing Sheets

(51) Int. Cl.
*B23D 47/02* (2006.01)
*B28D 1/04* (2006.01)
*B28D 1/00* (2006.01)
*B28D 7/04* (2006.01)

(56) References Cited

U.S. PATENT DOCUMENTS

| | | | |
|---|---|---|---|
| 3,877,334 | A | 4/1975 | Gerber |
| 4,112,797 | A | 9/1978 | Pearl |
| 4,116,097 | A | 9/1978 | Graham et al. |
| 4,204,448 | A | 5/1980 | Pearl |
| 4,309,600 | A | 1/1982 | Perry et al. |
| 4,312,254 | A | 1/1982 | Pearl |
| 4,436,078 | A | 3/1984 | Bourke |
| 4,738,174 | A | 4/1988 | Bloomquist |
| 4,949,610 | A | 8/1990 | Jones et al. |
| 5,003,729 | A | 4/1991 | Sherby |
| 5,056,272 | A | 10/1991 | Battaglia |
| 5,158,272 | A | 10/1992 | Biervert et al. |
| 5,349,788 | A | 9/1994 | Nedo et al. |
| 5,472,367 | A | 12/1995 | Slocum et al. |
| 5,782,673 | A | 7/1998 | Warehime |
| 5,921,228 | A | 7/1999 | Watson |
| 5,934,346 | A | 8/1999 | Windeisen et al. |
| 6,006,735 | A | 12/1999 | Schlough et al. |
| 6,222,155 | B1 | 4/2001 | Blackmon et al. |
| 6,276,990 | B1 | 8/2001 | Greenland |
| 6,299,510 | B1 | 10/2001 | Massenburg |
| 6,306,015 | B1 | 10/2001 | Bushell |
| 6,361,416 | B1 | 3/2002 | Hopkins et al. |
| 6,375,547 | B1 | 4/2002 | Massenburg |
| 7,748,373 | B2 | 7/2010 | Toncelli |
| 7,829,383 | B2 | 11/2010 | Yang |
| 7,939,374 | B2 | 5/2011 | Yang |
| 8,365,715 | B2 | 2/2013 | Toncelli |
| 9,003,936 | B2 | 4/2015 | Chillman et al. |
| 9,886,019 | B2 * | 2/2018 | Toncelli ............ G05B 19/18 |
| 2002/0028634 | A1 | 3/2002 | Massenburg |
| 2005/0079797 | A1 | 4/2005 | Marti et al. |
| 2006/0084364 | A1 | 4/2006 | Toncelli |
| 2007/0087661 | A1 | 4/2007 | Koyata et al. |
| 2008/0110311 | A1 | 5/2008 | Stangherlin |
| 2008/0213975 | A1 | 9/2008 | Yang |
| 2008/0227366 | A1 | 9/2008 | Toncelli |
| 2010/0300424 | A1 | 12/2010 | Toncelli |
| 2013/0025422 | A1 | 1/2013 | Chillman et al. |
| 2013/0237132 | A1 | 9/2013 | Vigano |

FOREIGN PATENT DOCUMENTS

| | | |
|---|---|---|
| DE | 4332630 A1 | 3/1995 |
| DE | 19603933 A1 | 8/1997 |
| DE | 29903578 U1 | 7/1999 |
| DE | 19837132 C1 | 11/1999 |
| DE | 69913680 T2 | 9/2004 |
| EP | 684340 A1 | 11/1995 |
| EP | 1136215 A2 | 9/2001 |
| EP | 1740359 B1 | 9/2007 |
| FR | 2548073 A | 1/1985 |
| JP | 55125417 U | 9/1980 |
| JP | 2003314998 A | 11/2003 |
| WO | 2005014252 A1 | 2/2005 |
| WO | 2006057024 A1 | 6/2006 |
| WO | 2012131567 A1 | 10/2012 |

OTHER PUBLICATIONS

"Granite cutting CNC SawJET by Northwood for Countertops", Feb. 21, 2011, Northwood, https://www.youtube.com/watch?v=Xony20abVc0 (Year: 2011).*

"Fusion CNC—The Saw/Waterjet of Choice!—Park Industries", Jul. 25, 2011, Park Industries, https://www.youtube.com/watch?v=acK7di8ZqPM (Year: 2011).*

"Combicut DJ/NC 550", Breton, http://bretonusa.com/wp-content/uploads/2012/11/DJ-NC-COMBICUT-2015-ita_gb.pdf, 2012, pp. 1-16.

"Flow's Mach 4r Waterjet Saw", Dec. 9, 2010, Flow Waterjet, https://www.youtube.com/watch?v=K_GMMo-PnFQ, 1 page.

"Numerical Control Cutting Centre, Diamond Disk and Waterjet Cutting Machine—Combicut DJ/NC—Breton S.p.a.", printed Jul. 5, 2016, http://www.breton.it/marble/en/product/Waterjet/Combicut_DJ_NC, 3 pages.

"Robotic Waterjet and Saw System optimizes countertop cutting", Dec. 21, 2010, ThomasNet, http://news.thomasnet.com/fullstory/robotic-waterjet-and-saw-system-optimizes-countertop-cutting-589082, 7 pages.

"USG Robotics RoboCut WaterJet Saw SawJet for Stone Fabrication", Sep. 16, 2010, USGRoboticsInc, https://www.youtube.com/watch?v=MBRd7bZRhqE, 1 page.

"We created the first water jet with blade combination, and now it's even better; CombiCut 550", Mar. 21, 2013, Breton, http://www.bretonusa.com/we-created-the-first-water-jet-with-blade-combination-and-now-its-even-better-combicut-550/, 2 pages.

Italian Search Report and Written Opinion dated Nov. 1, 2013 for related application IT TV201300048, 7 pgs.

Reis, Michael, "Waterjet fabricator roundup", Jun. 1, 2010, BNP Media, http://www.stoneworld.com/articles/85967-waterjetfabricator-roundup-1, 6 pages.

Styron, Clarence R. III, A Preview of Methods for Cutting Concrete, Water Jet Conference, May 24-26, 1983, pp. 295-305, Rolla, Missouri.

"2009 USG Robotics Robocut Robot 6-Axis CNC Sawjet w/Twin Tables", StoneMachineryLocator.com, http://stonemachinerylocator.com/details.mgi?id=3203, 2009, 3 pages.

"Brembana Sprint Jet / Sprint Jet Twin", CMS, http://stone.cmsna.com/brochures/3_Sprint_%20Jet.pdf, 2011, 1 page.

* cited by examiner

APPARATUS FOR CUTTING SLAB MATERIAL

RELATED APPLICATIONS

This application is a continuation of U.S. patent application Ser. No. 13/944,393, filed Jul. 17, 2013, which claims priority to Italian Application No. TV2013A000048 filed Apr. 10, 2013, the teachings of which are incorporated herein by reference.

FIELD OF THE INVENTION

The present invention relates to an apparatus for cutting slab material.

BACKGROUND

In particular, the present invention relates to a numerical-control apparatus for cutting stone, stone-like material, glass, ceramic or metal.

According to the art, interpolated-axis cutting machines for performing cutting, along straight or curved paths, of slabs of natural stone, natural-stone conglomerates or ceramic material into sub-elements are known.

The machines in question usually comprise a gantry-like structure where the upper beam is adapted to move above a working table on which the slab being machined is positioned. The beam has, arranged thereon, a support carriage which is slidable along the beam and on which a working unit movable vertically, towards or away from the working table, is mounted.

Depending on the type of machining operation, the working unit may be equipped with a spindle comprising a cutting disk, a nozzle for performing cutting by means of a water jet, or a combination of these two technologies.

As is known, with the cutting disk it is possible to perform straight cuts in several directions, since the spindle with cutting disk is generally mounted on a support which is able to rotate about a vertical axis, i.e. perpendicular to the working table, making it possible to obtain straight-side polygonal elements.

With this type of technology it is possible to obtain a very high cutting speed together with structural simplicity and mechanical strength. Moreover it is possible to perform inclined cuts, between a position which is perpendicular and a position which is parallel to the working table. In fact, the support on which the spindle with cutting disk is mounted allows the latter to rotate about an axis parallel to the working surface.

However, it is not possible to perform cuts along curved paths and it is in any case difficult to produce geometric forms, even if a simple nature, without the disk damaging the surface adjacent to the edge of the shape which is to be obtained from the slab.

With water-jet cutting technology a jet of water at a high pressure (for example 3000-4000 bar), preferably containing suspended granules of abrasive material, such as sand, is directed against the slab to be cut. The path of the jet is controlled by a nozzle which is adjustable, also in directions inclined with respect to the working table generally between a direction perpendicular and a direction parallel thereto.

Since it is necessary to dampen the water jet and recover the water used and the particles of abrasive material, the working table on which the slab to be cut is positioned is provided with a metallic grid which covers a tank filled with water.

The main advantage of this technology consists in allowing the formation of cuts which are very precise, including curved cuts. This advantage, however, is accompanied by a high operating cost.

In the prior art constructional solutions where these two technologies are combined, such that the straight cuts are performed with the cutting disk and the precise or curved cuts are performed by the water jet, are known.

An example of this type of combined apparatus may be found in U.S. Pat. Nos. 7,748,373 and 8,365,715 which describe an apparatus with a gantry-like structure of the type described further above, in which the working unit is equipped with a spindle comprising a cutting disk and a water-jet cutting nozzle.

The structure of the machine is similar to that described above and envisages a beam movable above a working table along two tracks. The beam has, arranged thereon, a support carriage which is slidable along the beam and on which the working unit is mounted. The working unit is movable vertically, towards or away from the working table and is provided with a spindle rotating about a vertical axis and equipped with water jet cutting means and disk cutting means.

The water-jet cutting nozzle is movable vertically with respect to the disk-carrying spindle between two positions: a retracted or rest position, when the cutting disk is used, and an extracted or operating position, when the water jet is used.

The working table consists of a tank, similar to that described above, closed by an interchangeable metallic grid. A sacrificial element for preventing contact between cutting disk and grid is placed on top of the grid. The sacrificial element may consist, for example, of a wooden board and more conveniently elements made of plastic or rubber material which are inserted on top of the profiles which form the grid.

The apparatus described above, although it has several advantages compared to the preceding apparatus, is not without drawbacks.

In fact, in the combined apparatus of the known type, only the cutting disk can be inclined with respect to the working table, while the nozzle has a fixed orientation with the direction of the jet perpendicular to the working table.

However, in some applications it may be required to perform inclined cuts also using a water jet, for example in the case where undercuts must be performed along short straight or curved sections.

Carrying out these machining operations on a dedicated machine performing cutting only using a water jet would mean that any of advantages associated with the use of a combined apparatus would be lost, in particular as regards the possibility of being able to use, on a single apparatus, the most appropriate technology for each machining operation.

The object of the present invention is therefore to overcome the drawbacks of the prior art.

Brief Summary of Embodiments of the Invention

A first task of the present invention is to provide a combined apparatus which allows the most appropriate technology to be used depending on the type of cut to be performed.

A second task of the present invention is to provide an apparatus for combined cutting using the disk and water jet with the possibility of performing inclined cuts also with the water jet.

Moreover, a task of the present invention is to provide a simple and compact apparatus in which the working unit has compact dimensions.

A further task of the present invention is to provide an apparatus in which the working time and costs are reduced compared to apparatus of the known type.

This object and the tasks are achieved with an apparatus according to claim 1.

In particular it has been thought to provide an apparatus for cutting slab material comprising a working table adapted to support the slabs to be cut during working, a working unit comprising disk cutting means and water-jet cutting means, and a unit for moving the working unit above the working table. The unit for moving the working unit comprises:
- a horizontal translation unit, adapted to move the working unit along two directions parallel to the working table and perpendicular to each other;
- a vertical translation unit, adapted to move the working unit along a direction perpendicular to the working table, towards or away from it;
- a first rotation unit, adapted to rotate the working unit about a first axis, perpendicular to the working table; and
- a second rotation unit, adapted to rotate the working unit about a second axis, inclined with respect to the direction perpendicular to the working table.

Hereinafter "working head" will be used to indicate the assembly comprising the first rotation unit, the second rotation unit and the working unit.

BRIEF DESCRIPTIONS OF DRAWINGS

The characteristic features and advantages of the present invention will emerge more clearly from the description, provided hereinbelow, of a number of non-limiting examples of embodiment, with reference to the accompanying drawings in which.

DETAILED DESCRIPTION OF EMBODIMENTS OF THE INVENTION

Figure 1:
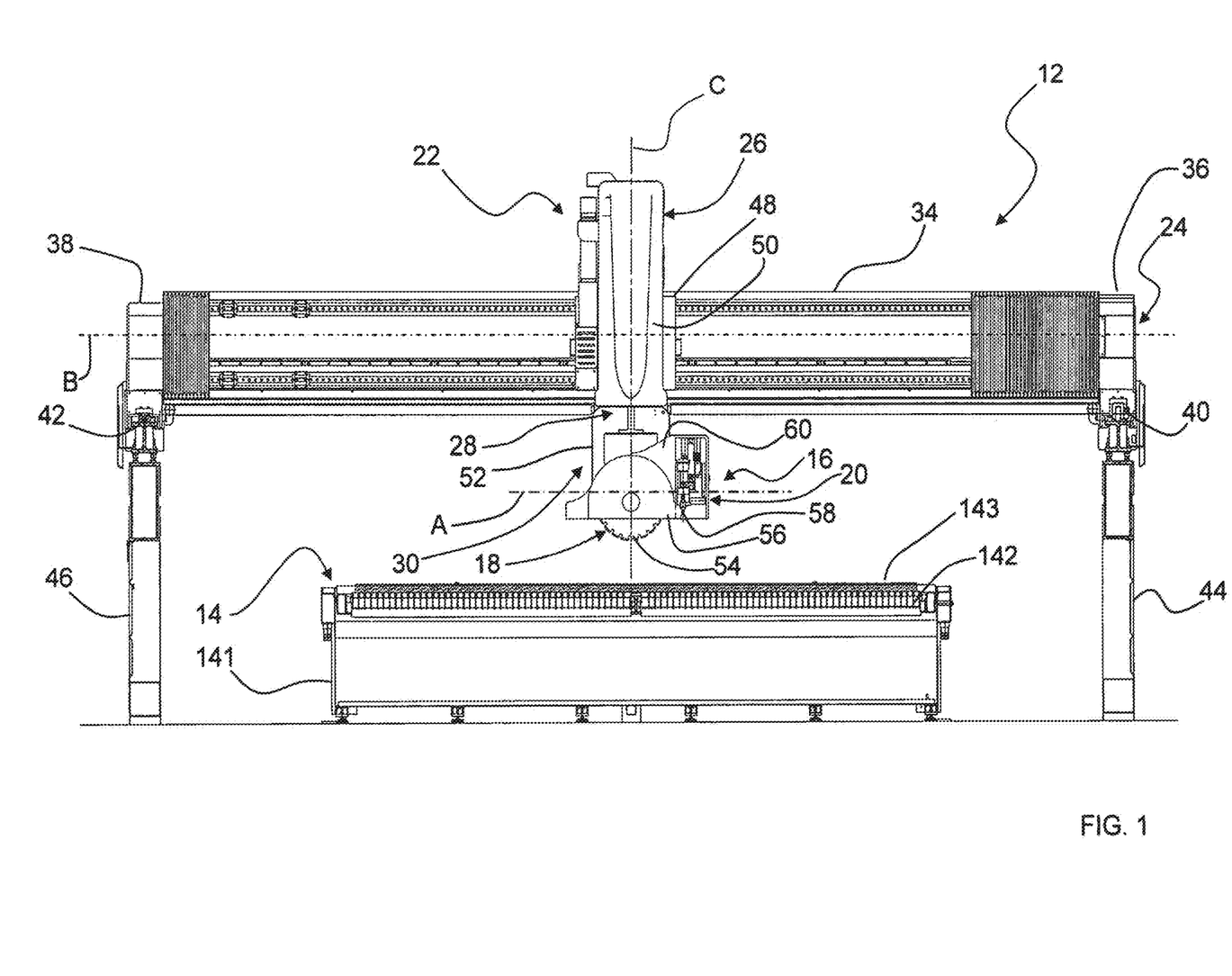
FIG. 1 shows a front view of an apparatus according to the present invention.

FIG. 1 shows an apparatus for cutting material in slab form, denoted overall by the reference number 12.

The machine 12 for cutting slab material according to the present invention comprises:
- a working table 14, adapted to support the slabs to be cut during machining;
- a working unit 16 comprising disk cutting means 18 and water-jet cutting means 20; and
- a unit 22 for moving the working unit 16 above the working table 14.

According to a possible embodiment of the present invention, the working table 14 comprises a tank 141 suitable for being filled with water and covered by an interchangeable metallic grid 142.

A sacrificial element 143 is positioned on the interchangeable metallic grid 142. The sacrificial element 143 is suitable for preventing incisions made on the metallic grid by the disk cutting means 18. The sacrificial element 143 may consist, for example, of a wooden board (as shown in FIG. 1) or advantageously plastic or rubber elements (not shown) which are inserted on top of the profiles which form the grid.

The unit 22 for moving the working unit comprises:
- a horizontal translation unit 24 adapted to move the working unit 16 along two directions parallel to the working table 14 and perpendicular to each other;
- a vertical translation unit 26, adapted to move the working unit 16 along a direction perpendicular to the working table 14 towards or away from it;
- a first rotation unit 28, adapted to rotate the working unit 16 about a first axis C which is vertical and substantially perpendicular to the working table 14; and
- a second rotation unit 30, adapted to rotate the working unit 16 about a second axis A, inclined with respect to the first axis C.

According to a possible embodiment of the present invention, the horizontal translation unit 24, which is adapted to move the working unit 16 along two directions parallel to the working table 14 and perpendicular to each other, comprises:
- a beam 34, the ends 36, 38 of which slide on respective tracks 40, 42 which are raised and arranged above lateral frames 44, 46; and
- a support carriage 48 movable along the beam 34, namely along a direction perpendicular to the direction of movement of the beam 34.

The particular embodiment described above will not be described in further detail since the constructional details may be easily deduced by the person skilled in the art.

It is also possible to envisage alternative embodiments in which the horizontal translation unit 24, which is adapted to move the working unit 16 along two directions parallel to the working table 14 and perpendicular to each other, comprises a gantry-like structure suitable for moving in a first direction above the working table 14. A support carriage 48 is arranged on the upper beam of the gantry-like structure in a similar manner described for the preceding embodiment.

According to a possible embodiment of the present invention, the vertical translation unit 26, which is adapted to move the working unit 16 along a direction perpendicular to the working table 14, towards or away from it, comprises a sleeve 50 mounted slidably on said support carriage 48. The movement of the sleeve 50 with respect to the support carriage 48 is performed in a manner known per se, so that it will not be described in greater detail.

According to a first embodiment of the present invention, the first rotation unit 28, which is adapted to rotate the working unit 16 about a vertical axis C perpendicular to the working table 14, comprises a fork 52 connected rotatably to the bottom end of the sleeve 50. In this case also, the rotation of the fork 52 with respect to the sleeve 50 may be obtained in a manner which can be easily imagined by the person skilled in the art, for example by means of a gearmotor provided on the sleeve 50.

A bracket 53 carrying the working unit 16 comprising the disk cutting means 18 and the water jet cutting means 20 is connected to the fork 52. The assembly comprising the fork 52, bracket 53 and working unit 16 is a bi-rotational working head of the so-called fork type.

Figure 5:
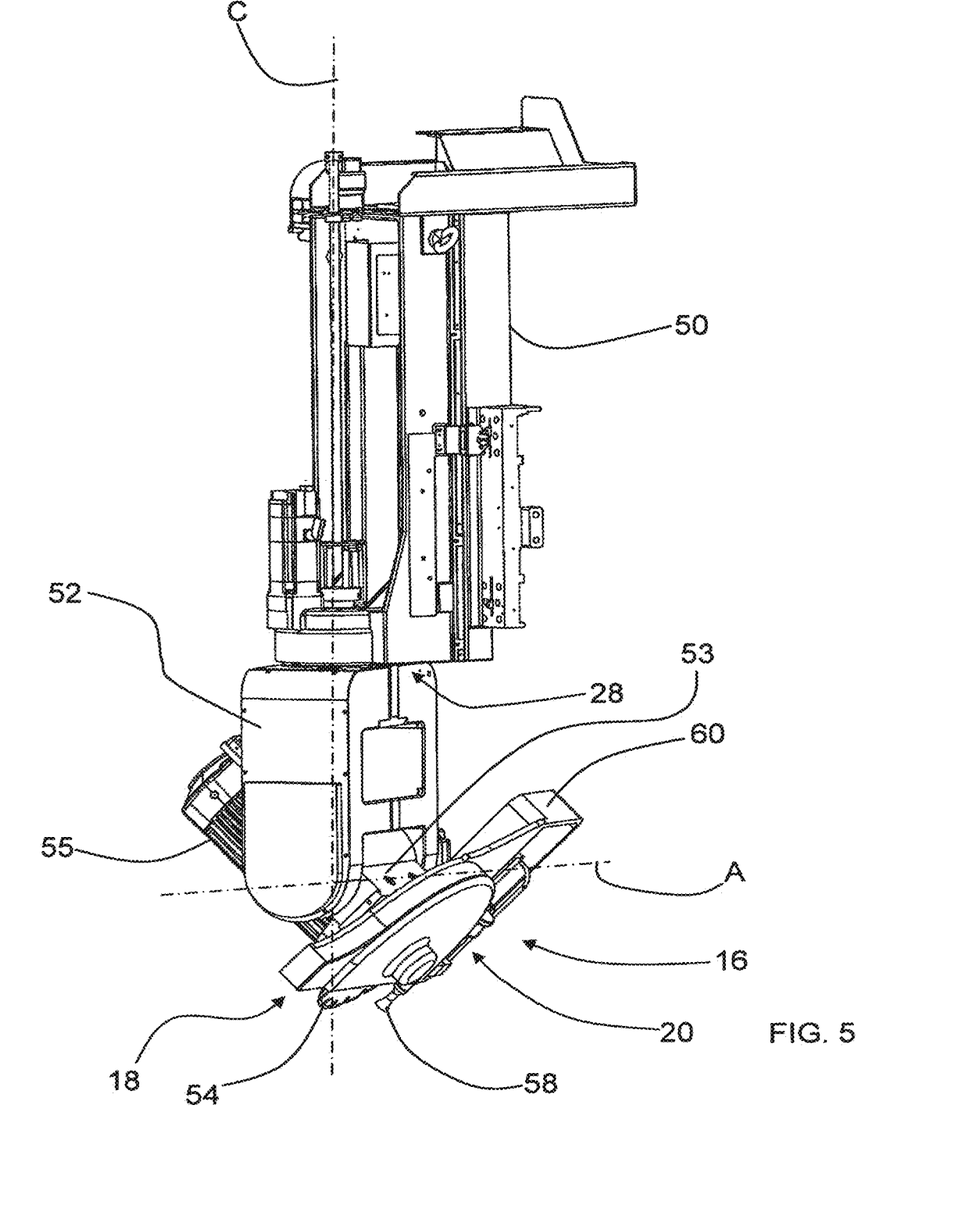
Figure 6:
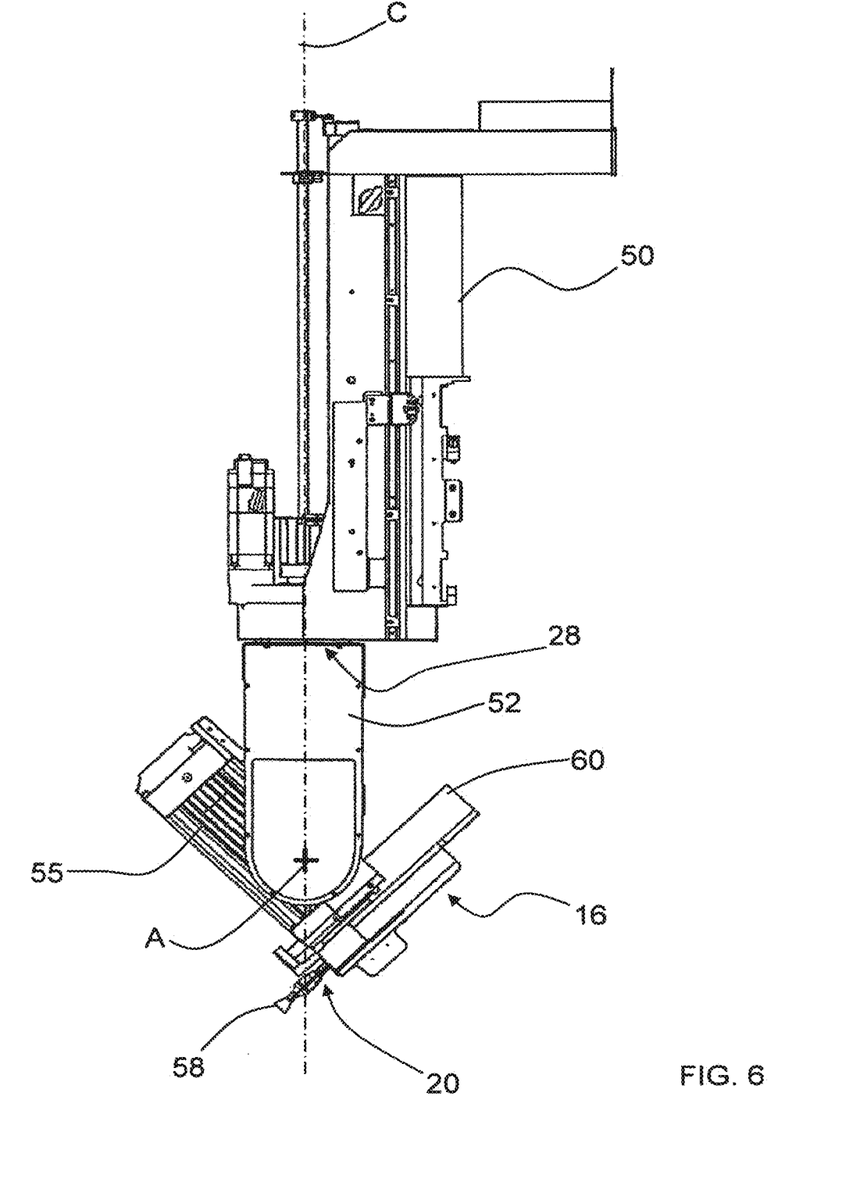
Figure 7:
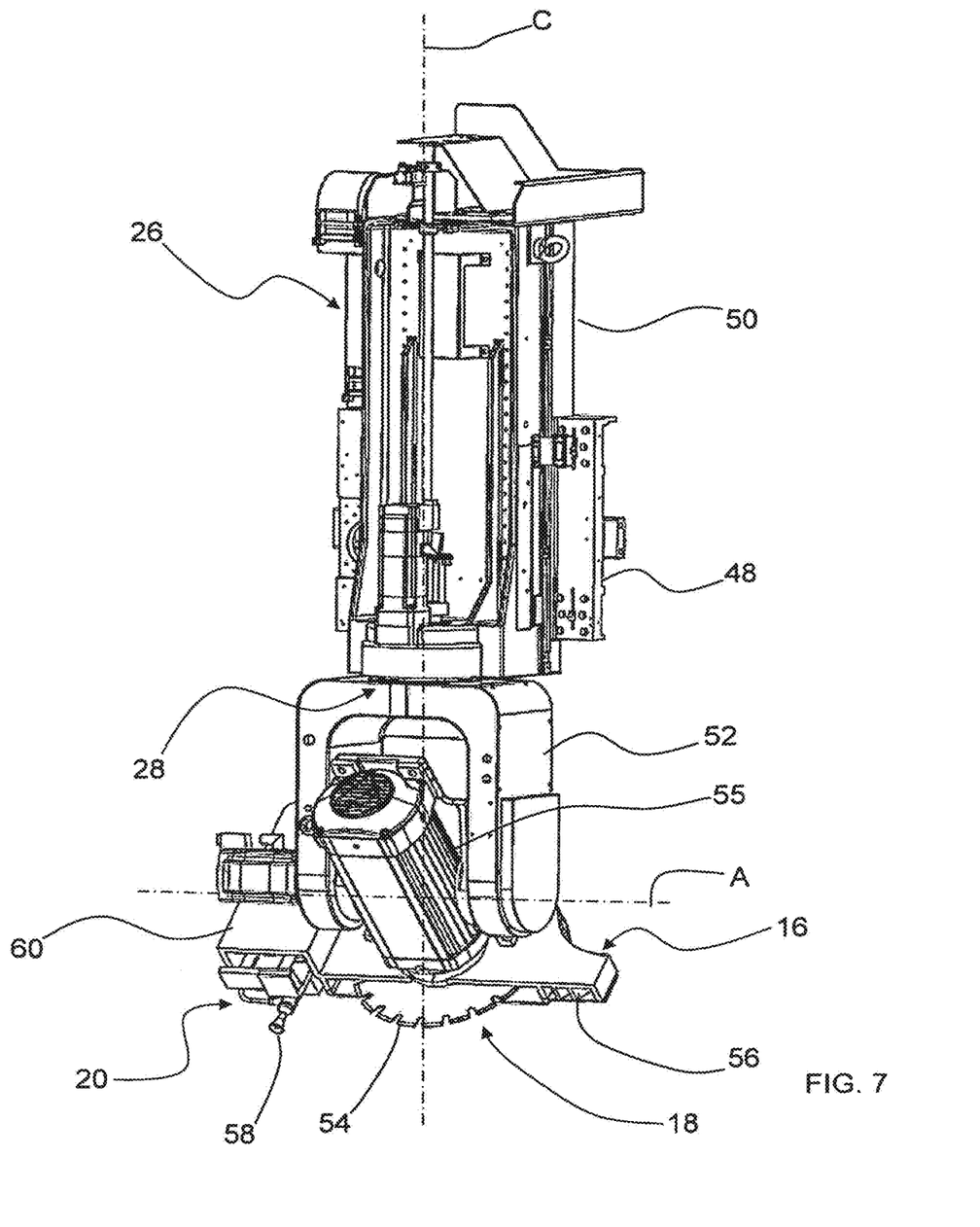

The disk cutting means 18 comprise a cutting disk 54, a motor-driven spindle 55 (visible in FIGS. 5-7) for rotation of the cutting disk 54 and a protective cowling 56. The cutting disk 54 may be of the known type, for example with a diamond-coated profile.

Figure 2:
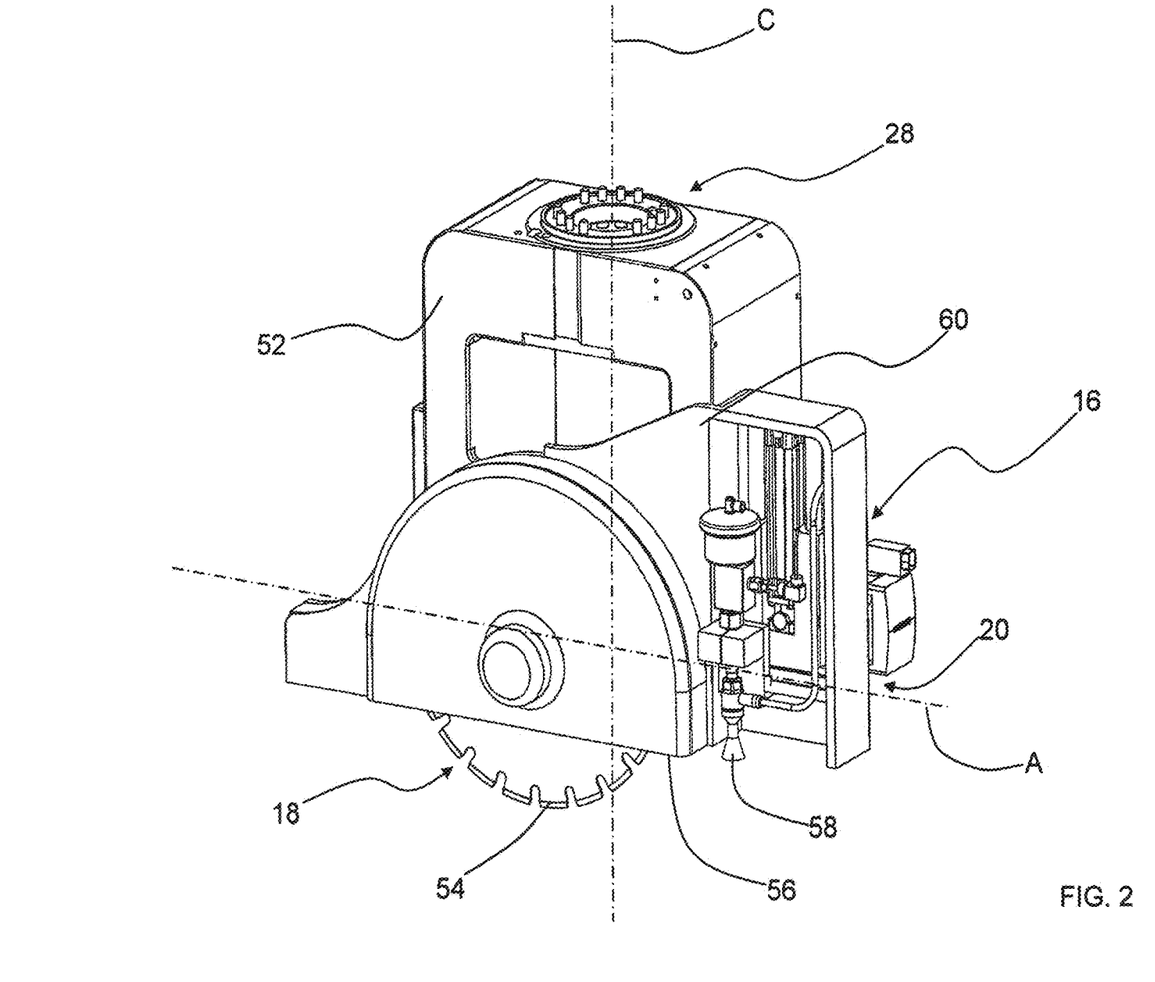
FIG. 2 shows a view, on a larger scale, of a working head according to the present invention with the nozzle in the retracted condition.
Figure 3:
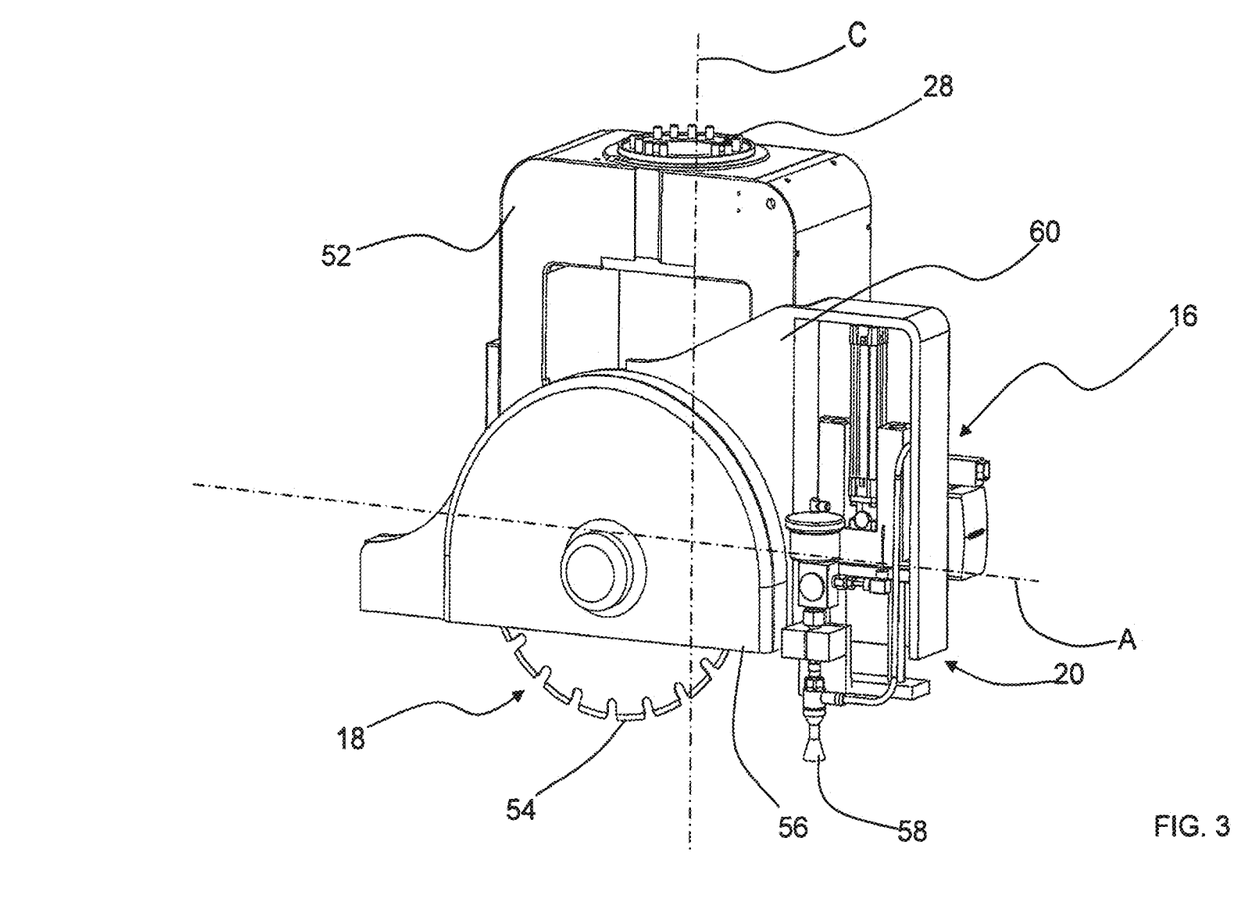
FIG. 3 shows a view, on a larger scale, of a working head according to the present invention with the nozzle in the extracted condition.
Figure 4:
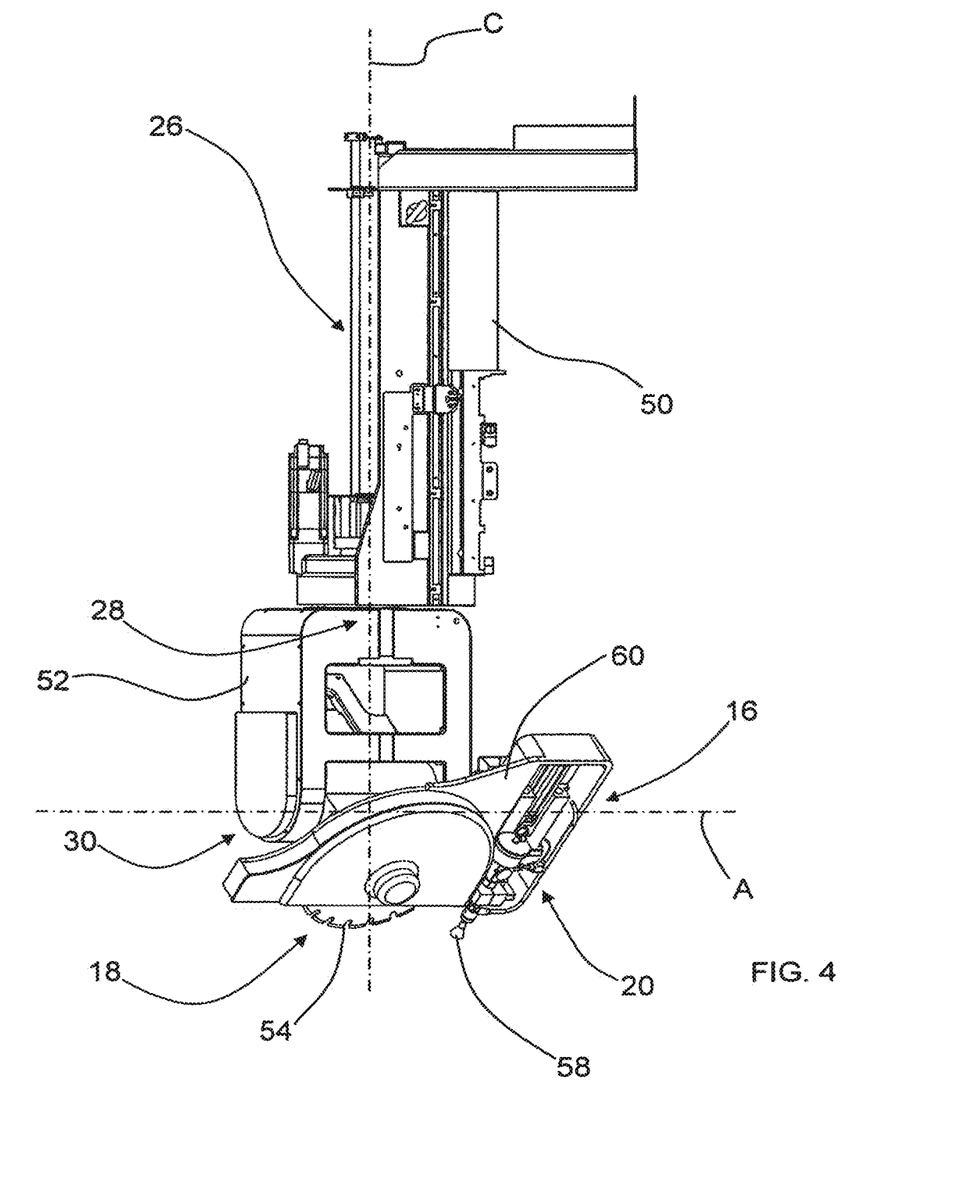
FIGS. 4-7 show views in several directions of a working head and part of an apparatus according to the present invention in which the working unit is rotated.

From FIGS. 2 and 3 it can be noted that the water-jet cutting means 20 comprise a nozzle 58 connected to a plant (not shown in detail since well-known to the person skilled in the art of water-jet cutting machines) which supplies the nozzle 58.

According to the embodiment of the present invention (shown in the accompanying figures), the disk cutting means 18 and the water-jet cutting means 20 are integral with each other and therefore the second rotation unit 30 is adapted to rotate simultaneously the said cutting means 18, 20.

This constructional solution is particularly advantageous since it results in a compact assembly consisting of the cutting means 18, 20 and simplifies significantly the structure since separate rotational means are not required for the disk cutting means 18 and the water-jet cutting means 20.

In fact the same means which rotate the disk cutting means 18 also rotate the water-jet cutting means 20 with evident savings in terms of the cost of the machine.

According to a possible embodiment, the water-jet cutting means 20 are provided on a supporting structure 60 integral with the protective cowling 56 as shown in the accompanying figures. Advantageously the water-jet cutting means 20 are arranged in line with respect to the cutting direction of the cutting disk 18.

The water-jet cutting nozzle 58 is movable with respect to the supporting structure 60 between two positions: a retracted or rest position, shown for example in FIG. 2, when the cutting disk is used, and an extracted or operating position, shown for example in FIG. 3, when the water jet is used.

The nozzle 58 may be moved by means of a pneumatic cylinder or by means of a mechanical-type drive unit. The movement of the nozzle 58 is obtained in a manner known per se and will therefore not be further described.

As described above, the nozzle 58 may be supplied by means of a pressurized water pipe (not shown).

Advantageously a further pipe (not shown) may be provided for supplying abrasive powder which will be advantageously mixed with water. In order to allow the pipes to be lowered and raised, suitable means (not shown in the figures), such as a pipe section bent in a U shape or a pipe section with a spirally folded shape so as to form a spring-like structure, may be provided.

In FIGS. 4-7 it can be noted that the working unit 16 is shown rotated about the second axis A through 45° with respect to the first vertical axis C so that the disk cutting means 18 and also the nozzle 58 of the water cutting means 20 are arranged in a position inclined at 45° with respect to the first vertical axis A. With this orientation of the working unit 16 it is possible to perform cuts inclined at 45° not only with the disk 18, but also with the water cutting means 20, by envisaging the interpolated movement of the axes of the apparatus controlled by the computerized unit for managing the apparatus.

Advantageously the working unit 16 is adapted to be inclined with respect to the perpendicular to the working table 14 (first axis A) at an angle of between 0 and 90°.

The movement of the bracket carrying the working unit 16 with respect to the fork 52 is performed in a manner known per se and will not be described in further detail for this reason.

Figure 8:
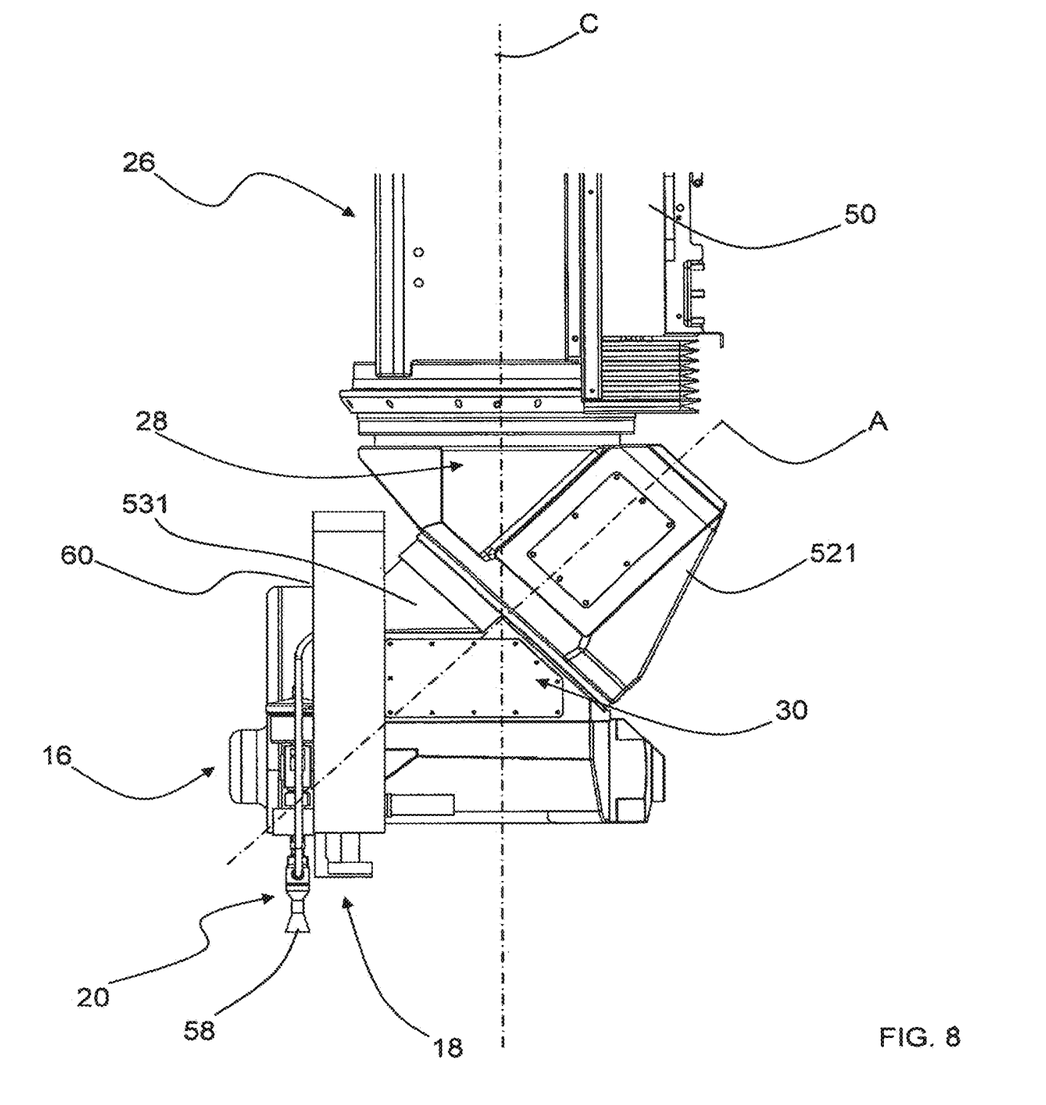
FIGS. 8 and 9 show a second embodiment of a working head according to the present invention in two different operating conditions.
Figure 9:
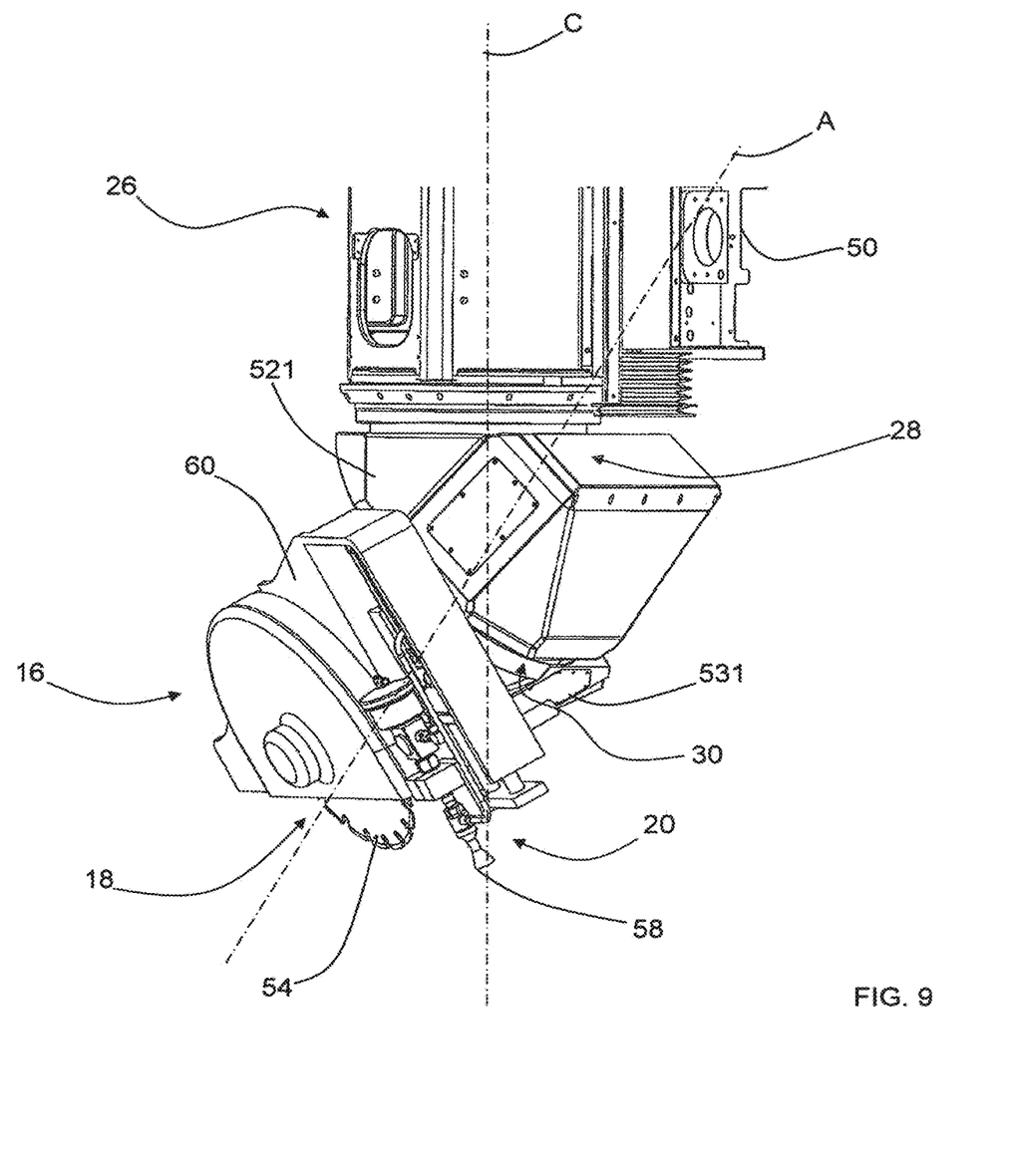

According to an alternative embodiment of the present invention, shown in FIGS. 8 and 9, the working head comprises two elements:

a first body 521 connected rotatably to the sleeve 50 about the first vertical axis C; and a second body 531 connected rotatably to the first body 521 about the second axis A, inclined at 45° with respect to the first vertical axis C.

The working unit 16 is connected to the bottom end of the second body 531.

The rotation of the first body 521 with respect to the sleeve 50, and the rotation of the second body 531 with respect to the first body 521, are obtained in a manner known per se to the person skilled in the art and will therefore not be further described.

FIG. 8 shows a first operating configuration in which the cutting disk 54 and nozzle 58 are perpendicular to the working table 14, while FIG. 9 shows a second operating configuration in which the cutting disk 54 and the nozzle 58 are inclined at an angle less than 90° with respect to the working table 14.

Both the constructional solutions described above envisage a working unit 16 mounted on what is known as a bi-rotational working head, namely a head which allows rotation about two axes which may also be interpolated.

The advantages of the apparatus according to the present invention compared to the prior art are therefore evident. In particular, a combined apparatus is provided where it is possible use the most appropriate technology depending on the type of cut which must be performed.

A combined apparatus able to perform inclined cuts using also a water jet is provided.

Moreover, the apparatus is simple and compact since the working unit occupies a small amount of space.

Advantageously, the working time and costs are reduced compared to the apparatus of the known type since it is no longer required to use a separate dedicated machine for inclined cutting using a water jet in addition to the disk cutting machine.

Obviously, the above description of an embodiment applying the innovative principles of the present invention is provided by way of example of these innovative principles and must therefore not be regarded as limiting the scope of the rights claimed herein.

With regard to the embodiments described above, the person skilled in the art may, in order to satisfy specific requirements, make modifications to and/or replace elements described with equivalent elements, without thereby departing from the scope of the accompanying claims.

For example embodiments may be envisaged where the working unit 16 is arranged on a mechanical arm of the anthropomorphic type.

The invention claimed is:

1. A method of cutting slab material comprising:
providing a working unit comprising disk cutting means and water-jet cutting means;
providing a working table that supports slabs to be cut during working; and
moving the working unit above the working table with use of:

a horizontal translation unit that moves the working unit along two directions parallel to the working table, the two directions being perpendicular to each other;
a vertical translation unit that moves the working unit along a direction perpendicular to the working table, either toward or away from the working table; and
a first rotation unit that rotates the working unit about a first axis which is vertical and substantially perpendicular to the working table;
wherein the horizontal translation unit further comprises:
a beam having ends which slide on respective tracks which are raised and arranged above lateral frames; and
a support carriage movable along the beam in a direction perpendicular to a moving direction of the beam.

2. The method of claim 1, wherein the working table comprises a tank closed by an interchangeable metallic grid, and further comprising a step of placing a sacrificial element on top of the grid so as to prevent contact between the disk cutting means and the grid.

3. The method of claim 1, further comprising a step of providing the water-jet cutting means on a supporting structure integral with a protective cowling of the disk cutting means.

4. The method of claim 1, further comprising a step of arranging the water jet cutting means in line with respect to a cutting direction of the disk cutting means.

5. The method of claim 1, wherein said water-jet cutting means comprise a nozzle, and further comprising a step of moving the nozzle between a retracted position and a rest position with respect to the working unit when the disk cutting means are utilized, and between an extracted position and an operative position when the water jet cutting means are utilized.

6. The method of claim 1, further comprising a step of inclining the working unit with respect to the first axis at an angle of between 0 and 90°.

7. The method of claim 1, further comprising a second rotation unit that rotates the working unit about a second axis so as to be inclined with respect to the first axis.

8. The method of claim 7, further comprising a step of inclining said second axis at 90° with respect to the first axis.

9. The method of claim 8, wherein said first rotation unit comprises a fork rotatably connected to a sleeve and wherein said second rotation unit comprises a bracket rotatably connected to said fork, and further comprising a step of moving the working unit by rotating said bracket about the second axis.

10. The method of claim 7, further comprising a step of inclining the second axis at 45° with respect to the first axis.

11. The method of claim 10, wherein said first rotation unit comprises a first body rotatably connected to a sleeve, and wherein said second rotation unit comprises a second body rotatably connected to the first body, and further comprising a step of moving the working unit by rotating the second body about the second axis.

12. The method of claim 1, wherein the vertical translation unit comprises a sleeve, and further comprising a step of slidably mounting the sleeve on said support carriage.

13. The method of claim 1, wherein said disk cutting means and said water-jet cutting means are integral with each other, and further comprising a step of simultaneously adjusting the water-jet cutting means with adjustment of the disk cutting means.

14. The method of claim 1, wherein said disk cutting means and said water-jet cutting means are integral with each other, and further comprising a step of correspondingly adjusting the water jet cutting means with adjustment of the disk cutting means.

15. The method of claim 14, wherein the adjustment comprises inclining the disk cutting means with respect to the first axis, with corresponding adjustment of the water-jet cutting means.

16. The method of claim 1, wherein said disk cutting means and said water-jet cutting means are integral with each other.

17. The method of claim 16, wherein the water-jet cutting means are arranged in line with respect to the cutting direction of a cutting disk of the disk cutting means.

18. A method of cutting slab material comprising:
providing a working unit comprising disk cutting means and water-jet cutting means;
providing a working table that supports slabs to be cut during working; and
moving the working unit above the working table with use of a horizontal translation unit and optionally any of the following:
a vertical translation unit that moves the working unit along a direction perpendicular to the working table, either toward or away from the working table;
a first rotation unit that rotates the working unit about a first axis which is vertical and substantially perpendicular to the working table; and
a second rotation unit that rotates the working unit about a second axis so as to be inclined with respect to the first axis;
wherein the horizontal translation unit moves the working unit along two directions parallel to the working table, the two directions being perpendicular to each other and further comprises:
a beam having ends which slide on respective tracks which are raised and arranged above lateral frames; and
a support carriage movable along the beam in a direction perpendicular to a moving direction of the beam; and
further comprising a step of forming a bi-rotational head via the first rotation unit, the second rotation unit and the working unit.

19. A method of cutting slab material comprising:
providing a working unit comprising disk cutting means and water-jet cutting means;
providing a working table that supports slabs to be cut during working; and
moving the working unit above the working table with use of a horizontal translation unit and optionally any of the following:
a vertical translation unit that moves the working unit along a direction perpendicular to the working table, either toward or away from the working table;
a first rotation unit that rotates the working unit about a first axis which is vertical and substantially perpendicular to the working table; and
a second rotation unit that rotates the working unit about a second axis so as to be inclined with respect to the first axis;
wherein the horizontal translation unit moves the working unit along two directions parallel to the working table, the two directions being perpendicular to each other and further comprises:

a beam having ends which slide on respective tracks which are raised and arranged above lateral frames; and a support carriage movable along the beam in a direction perpendicular to a moving direction of the beam; and wherein when the working unit is rotated, the disk cutting means and the water-jet cutting means rotate simultaneously.

* * * * *